US012780212B2

(12) United States Patent
Honjo

(10) Patent No.: US 12,780,212 B2
(45) Date of Patent: Nov. 3, 2026

(54) VEHICLE CONTROL DEVICE, VEHICLE, VEHICLE CONTROL METHOD, AND STORAGE MEDIUM

(71) Applicant: HONDA MOTOR CO., LTD., Tokyo (JP)

(72) Inventor: Takuya Honjo, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 60 days.

(21) Appl. No.: 19/055,866

(22) Filed: Feb. 18, 2025

(65) Prior Publication Data

US 2025/0289438 A1 Sep. 18, 2025

(30) Foreign Application Priority Data

Mar. 15, 2024 (JP) ................................ 2024-041129

(51) Int. Cl.
*B60W 30/184* (2012.01)
*B60W 10/08* (2006.01)

(52) U.S. Cl.
CPC ........ *B60W 30/1843* (2013.01); *B60W 10/08* (2013.01); *B60W 2510/087* (2013.01); *B60W 2520/403* (2013.01); *B60W 2555/20* (2020.02)

(58) Field of Classification Search
CPC ............. B60W 30/1843; B60W 10/08; B60W 2555/20; B60W 2510/087; B60W 2520/403; B60W 10/00; B60L 16/2036; B60K 6/40
USPC ........................................................... 701/22
See application file for complete search history.

(56) References Cited

U.S. PATENT DOCUMENTS 12,377,853 B2 * 8/2025 Chiba .................. B60W 30/19
2009/0229905 A1 * 9/2009 Kato ....................... F16D 23/12
192/93 R
2012/0101675 A1 4/2012 Saito
2013/0289814 A1 * 10/2013 Tanaka ................. B60W 20/00
180/65.21
2025/0256717 A1 * 8/2025 Uchida ................ B60W 10/06

FOREIGN PATENT DOCUMENTS

EP 2093092 A2 * 8/2009 ............ F16D 13/74
JP 2012-095378 A 5/2012
JP 2022-170419 A 11/2022
JP 2023-121669 A 8/2023
WO WO-2009060293 A2 * 5/2009 .......... B60W 30/188

* cited by examiner

*Primary Examiner* — Tuan C To
(74) *Attorney, Agent, or Firm* — Carrier, Shende & Associates P.C.; Joseph P. Carrier; Fulchand P. Shende

(57) ABSTRACT

The vehicle control device decreases the second driving force at a first rate of decrease when limiting the second driving force in a state where the second driving force limiting process is not executed, and decreases the second driving force at a second rate of decrease smaller than the first rate of decrease when the second determination unit determines that the second condition is fulfilled in a state where the second driving force limiting process is executed.

12 Claims, 7 Drawing Sheets

VEHICLE CONTROL DEVICE, VEHICLE, VEHICLE CONTROL METHOD, AND STORAGE MEDIUM

CROSS-REFERENCE TO RELATED APPLICATIONS

This application is based upon and claims the benefit of priority from Japanese Patent Application No. 2024-041129 filed on Mar. 15, 2024, the contents of which are incorporated herein by reference.

BACKGROUND OF THE INVENTION

Field of the Invention

The present disclosure relates to a vehicle control device, a vehicle, a vehicle control method, and a storage medium.

Description of the Related Art

JP 2012-095378 A discloses a motor control apparatus for an electric vehicle. According to JP 2012-095378 A, the electric vehicle includes a front motor and a rear motor. The motor control apparatus can distribute a demand torque to a driving torque of the front motor and a driving torque of the rear motor.

SUMMARY OF THE INVENTION

In recent years, a technique capable of allowing a vehicle to exhibit stable traveling performance for a longer period of time has been desired.

The present invention has the object of solving the aforementioned problem.

A first aspect of the present invention is to provide a vehicle control device for controlling a vehicle including a first driving source for driving a first drive wheel and a second driving source for driving a second drive wheel, the vehicle control device comprising: a first determination unit configured to determine whether a predetermined first condition is fulfilled; a second determination unit configured to determine whether a second condition different from the first condition is fulfilled; and a control unit configured to execute a second driving force limiting process for limiting a second driving force output from the second driving source in a case that the first determination unit determines that the first condition is fulfilled, and further limit the second driving force in a case that the second determination unit determines that the second condition is fulfilled in a state where the second driving force limiting process is being executed, wherein the control unit is configured to decrease the second driving force at a first rate of decrease in a case that the second driving force is limited while the second driving force limiting process is not being executed, and decrease the second driving force at a second rate of decrease smaller than the first rate of decrease in a case that the second determination unit determines that the second condition is fulfilled while the second driving force limiting process is being executed.

A second aspect of the present invention is to provide a vehicle including the vehicle control device according to the first aspect of the present invention.

A third aspect of the present invention is to provide a vehicle control method executed by a computer for controlling a vehicle including a first driving source for driving a first drive wheel and a second driving source for driving a second drive wheel, the vehicle control method comprising: a first determination step of determining whether a predetermined first condition is fulfilled; a first control step of executing a second driving force limiting process for limiting a second driving force output from the second driving source in a case that fulfillment of the first condition is determined in the first determination step; a second determination step of determining whether a second condition different from the first condition is fulfilled; and a second control step of further limiting the second driving force in a case that fulfillment of the second condition is determined in the second determination step, wherein in the second control step, the second driving force is decreased at a second rate of decrease smaller than a first rate of decrease at which the second driving force is decreased to be limited while the second driving force limiting process is not being executed.

A fourth aspect of the present invention is a storage medium storing a program for causing the computer to execute the vehicle control method according to the third aspect of the present invention.

According to the present invention, the vehicle can exhibit stable traveling performance for a longer period of time.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE INVENTION

JP 2012-095378 A proposes to suppress overheating of one of two driving sources (a front motor and a rear motor) by changing a driving force distribution ratio between the two driving sources.

However, there is a problem that the driving stability of the vehicle is affected due to a rapid decrease in the driving force distributed to one of the two driving sources. That is, the conventional techniques including JP 2012-095378 A have a problem that it is difficult to maintain the driving stability of the vehicle while suppressing overheating of the plurality of drive sources provided in the vehicle.

Based on the above preliminary description, an embodiment will be described below.

Embodiment

Figure 1:
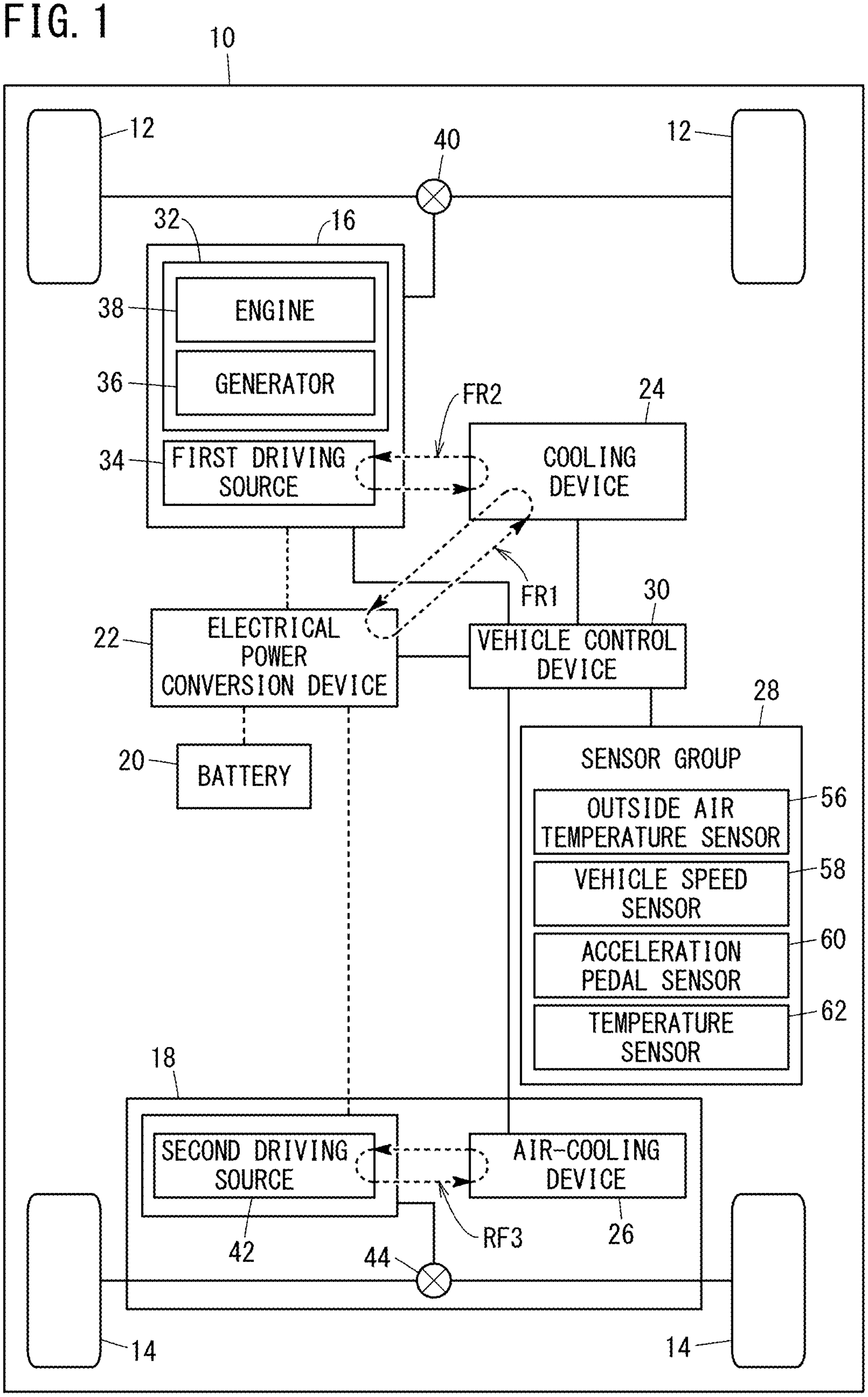
FIG. 1 is a schematic view showing a vehicle according to an embodiment.

FIG. 1 is a schematic view showing a vehicle 10 according to an embodiment.

The vehicle 10 is, for example, an all-wheel drive (AWD) vehicle. In the present embodiment, a case where the vehicle 10 is a hybrid AWD vehicle will be described as an example. The vehicle 10 includes a first drive wheel 12, a second drive wheel 14, a first drive device 16, a second drive device 18, a battery 20, an electrical power conversion device 22, a cooling device 24, an air-cooling device 26, a sensor group (a plurality of sensors) 28, and a vehicle control device 30.

The first drive wheel 12 is one of a front wheel and a rear wheel of the vehicle 10. In the present embodiment, a case where the first drive wheel 12 is a front wheel will be described as an example, but the present invention is not limited thereto. On the other hand, the second drive wheel 14 is the other of the front wheel and the rear wheel of the vehicle 10. In the present embodiment, a case where the second drive wheel 14 is a rear wheel will be described as an example, but the present invention is not limited thereto.

The first drive device 16 is a device that drives the first drive wheel 12. The first drive device 16 includes a power generation unit 32 and a first driving source 34. The power generation unit 32 includes a generator 36 and an internal combustion engine 38. The engine 38 (an output shaft of the engine 38) may drive the generator 36. The generator 36 generates electrical power by being driven by the engine 38. The power generation unit 32 can supply electrical power to the first driving source 34 and a second driving source 42 (second drive device 18) to be described later.

The first driving source 34 is an electric motor (motor) that can be driven by electrical power supplied from the generator 36. The first driving source 34 can transmit a driving force to the first drive wheel 12 via a first transmission mechanism 40. The first transmission mechanism 40 includes, for example, a transmission (not shown).

The engine 38 can supply a driving force to the first drive wheel 12 via the first transmission mechanism 40. The first drive wheel 12 may be driven by the driving force supplied from the first driving source 34 via the first transmission mechanism 40, or may be driven by the driving force supplied from the engine 38 via the first transmission mechanism 40.

The driving force output from the first drive device 16 toward the first drive wheel 12 is also referred to as a first driving force DRV1 in the following description. In the following description, unless otherwise specified, the first driving force DRV1 is output from the first driving source 34.

The second drive device 18 is a device that drives the second drive wheel 14. The second drive device 18 includes a second driving source 42 and a second transmission mechanism 44 connected to the second driving source 42. The second driving source 42 is an electric motor different from the first driving source 34. A shaft of the second driving source 42 is connected to the second drive wheel 14 via a second transmission mechanism 44. Therefore, the second driving source 42 can transmit the driving force to the second drive wheel 14 via the second transmission mechanism 44. The second transmission mechanism 44 includes, for example, a transmission (not shown). The second driving source 42 can be driven by electrical power supplied from the generator 36 (first drive device 16). The electrical power supply from the generator 36 to the second driving source 42 can be carried out via the electrical power conversion device 22. In the case where the first drive wheel 12 is driven by the first drive device 16, the second driving source 42 may be used to generate regenerative electrical power.

The driving force output from the second drive device 18 (second driving source 42) toward the second drive wheel 14 is also referred to as a second driving force DRV2 in the following description.

The electrical power conversion device 22 is connected to the first drive device 16, the second drive device 18, and the battery 20. The electrical power conversion device 22 includes, for example, a converter, an inverter, and the like. The electrical power conversion device 22 can convert electrical power supplied from the first drive device 16 to the second driving source 42.

The battery 20 is a rechargeable secondary battery. The battery 20 includes, for example, a plurality of battery cells (not shown). Each of the plurality of battery cells is, for example, a lithium ion battery, a nickel-metal hydride battery, or the like, but is not limited thereto. The battery 20 is charged with, for example, electrical power generated by the generator 36. The battery 20 may be charged with the regenerative electrical power described above. In this case, the electrical power conversion device 22 may convert the electrical power to be supplied to the battery 20.

The battery 20 storing electricity can supply electrical power to at least one of the first drive device 16 (first driving source 34) and the second drive device 18 (second driving source 42) as necessary. In this case, the electrical power conversion device 22 described above may convert the electrical power to be supplied to at least one of the first drive device 16 and the second drive device 18 from the battery 20.

Figure 2:
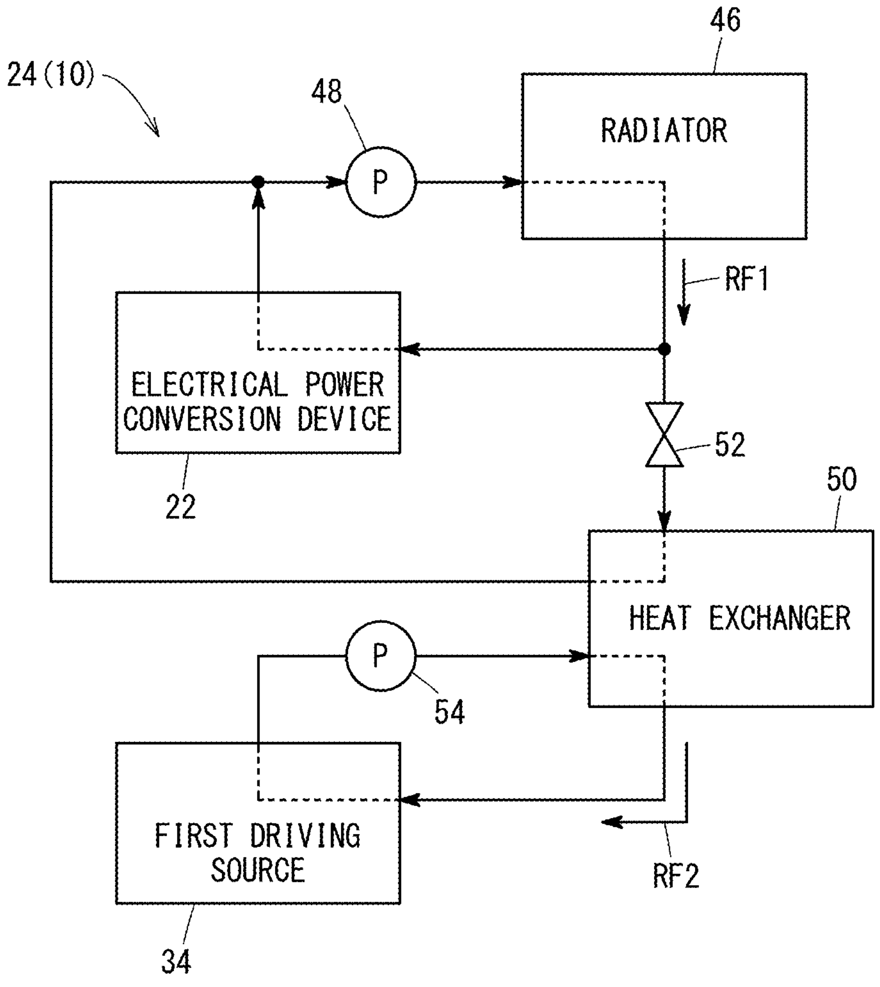
FIG. 2 is a schematic view showing a cooling device provided in the vehicle.

FIG. 2 is a schematic view showing a cooling device 24 provided in the vehicle 10.

The cooling device 24 is a device provided for cooling the electrical power conversion device 22 by the refrigerant RF1 and cooling the first driving source 34 by the refrigerant RF2. The refrigerant RF1 is a liquid refrigerant. The liquid refrigerant may be water or oil. The refrigerant RF2 is preferably, but not limited to, a liquid refrigerant.

As shown in FIG. 2, the cooling device 24 includes a radiator 46, a first pump 48, a heat exchanger 50, a valve device 52, and a second pump 54. The radiator 46 serves to cool the refrigerant RF1. The first pump 48 can circulate the refrigerant RF1 between the radiator 46 and the electrical power conversion device 22. The first pump 48 may also circulate the refrigerant RF1 between the radiator 46 and the heat exchanger 50. The first pump 48 may feed the refrigerant RF1 cooled by the radiator 46 to the electrical power conversion device 22 and to the heat exchanger 50. The amount of the refrigerant RF1 to be supplied to the electrical power conversion device 22 and the amount of the refrigerant RF1 to be supplied to the heat exchanger 50 can be adjusted by the valve device 52. The electrical power conversion device 22 is cooled by the refrigerant RF1 supplied to the electrical power conversion device 22. The second pump 54 circulates the refrigerant RF2 between the heat exchanger 50 and the first driving source 34. The refrigerant RF2 exchanges heat with the refrigerant RF1 via the heat exchanger 50. As described above, the refrigerant RF1 to be supplied to the heat exchanger 50 is cooled by the radiator 46. Therefore, the refrigerant RF2 can be cooled (liquid-cooled) by the refrigerant RF1 via the heat exchanger 50.

With the cooling device 24, the electrical power conversion device 22 (refrigerant RF1) and the first driving source 34 (refrigerant RF2) are cooled substantially by one radiator 46. Further, with the cooling device 24, the refrigerant RF2 for cooling the first driving source 34 is liquid-cooled by the refrigerant RF1 which is a liquid refrigerant. In general, the cooling efficiency by liquid cooling is better than the cooling efficiency by air cooling.

As shown in FIG. 1, the air-cooling device 26 may be provided in the second drive device 18 of the vehicle 10. The air-cooling device 26 is a device that cools the refrigerant RF3. The refrigerant RF3 is a refrigerant for cooling the second driving source 42. The refrigerant RF3 is preferably, but not limited to, a liquid refrigerant. The air-cooling device 26 air-cools the refrigerant RF3 by using, for example, outside air. Although not shown in detail, the air-cooling device 26 includes, for example, a housing that houses the second driving source 42 and the refrigerant RF3. Such a housing is provided with a heat dissipation portion. The heat dissipation portion has, for example, a fin shape. The heat dissipation portion actively performs heat exchange when the traveling wind is passing therethrough. The refrigerant RF3 exchanges heat with the outside air through the heat dissipation portion. The refrigerant RF3 can thus be air-cooled. The second driving source 42 can be cooled by the air-cooled refrigerant RF3.

As shown in FIG. 1, the sensor group 28 includes, for example, an outside air temperature sensor 56, a vehicle speed sensor 58, an accelerator pedal sensor 60, and a temperature sensor 62. The outside air temperature sensor 56 is a sensor for detecting the outside air temperature. The vehicle speed sensor 58 detects the vehicle speed that is a travel speed of the vehicle 10. The accelerator pedal sensor 60 detects an accelerator opening (accelerator pedal (AP) opening) of the vehicle 10. The temperature sensor 62 detects a temperature of the second driving source 42. The temperature sensor 62 may detect a temperature of the refrigerant RF3 as the temperature of the second driving source 42. Various detection signals output from the sensor group 28 are input to the vehicle control device 30.

Figure 3:
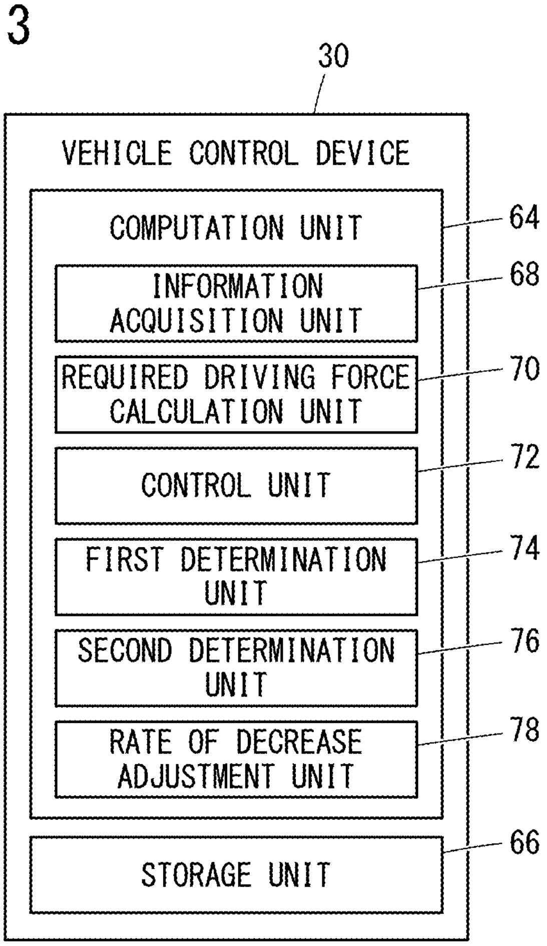
FIG. 3 is a block diagram of a vehicle control device according to the embodiment.

FIG. 3 is a block diagram of a vehicle control device 30 according to the embodiment.

The vehicle control device 30 is an electronic device (computer) that controls the vehicle 10. The vehicle control device 30 is included in, for example, an electronic control unit (ECU). The vehicle control device 30 includes a computation unit 64 and a storage unit 66.

The computation unit 64 includes a predetermined processing circuitry (not shown). The processing circuitry, for example, includes at least one processor such as a CPU (Central Processing Unit), a GPU (Graphics Processing Unit), or the like. The processing circuitry may include a predetermined integrated circuit such as an application specific integrated circuit (ASIC) or a field-programmable gate array (FPGA).

The storage unit 66 includes one or more memories. The one or more memories include a nonvolatile memory. The nonvolatile memory is a storage medium that non-transitorily stores a program, a table, a map, and the like. Examples of the nonvolatile memory include, for example, a ROM (Read Only Memory), a flash memory, or the like. The storage unit 66 (one or more memories) may include a volatile memory. Examples of the volatile memory include, for example, a RAM (Random Access Memory) or the like.

The computation unit 64 includes an information acquisition unit 68, a required driving force calculation unit 70, a control unit 72, a first determination unit 74, a second determination unit 76, and a rate of decrease adjustment unit 78. The information acquisition unit 68, the required driving force calculation unit 70, the control unit 72, the first determination unit 74, the second determination unit 76, and the rate of decrease adjustment unit 78 can be realized by the computation unit 64 (processor) executing programs which are stored in the storage unit 66 (memory). At least a portion of the information acquisition unit 68, the required driving force calculation unit 70, the control unit 72, the first determination unit 74, the second determination unit 76, and the rate of decrease adjustment unit 78 may be realized by the integrated circuit such as the ASIC or the FPGA described above.

The information acquisition unit 68 acquires various kinds of information based on the detection signals supplied from the sensor group 28 (FIG. 1). For example, the information acquisition unit 68 can acquire information indicating the outside air temperature based on the detection signal of the outside air temperature sensor 56. The information acquisition unit 68 can acquire information indicating the vehicle speed based on the detection signal of the vehicle speed sensor 58. The information acquisition unit 68 can acquire information indicating the AP opening degree based on the detection signal of the accelerator pedal sensor 60. The information acquisition unit 68 can acquire information indicating the second driving source temperature based on the detection signal of the temperature sensor 62.

The required driving force calculation unit 70 calculates a required driving force (a numerical value indicating the required driving force). The required driving force is a driving force required for the vehicle 10. The required driving force is calculated based on, for example, the vehicle speed and the AP opening degree.

The control unit 72 executes a process for determining a driving force distribution ratio and a process for travel control.

The process for determining the driving force distribution ratio is a process for determining the driving force distribution ratio between the first drive wheel 12 and the second drive wheel 14 that are driven so as to satisfy the required driving force. The control unit 72 determines the driving force distribution ratio based on, for example, the required driving force (AP opening) and the vehicle speed. The control unit 72 may determine the driving force distribution ratio using a control map in which a relationship among the required driving force, the vehicle speed, and the driving force distribution ratio is defined. The control map is stored in advance in the storage unit 66, for example.

The driving force distribution ratio may be determined (changed) in accordance with an operation instruction from a driver who drives the vehicle 10. For example, the driver may instruct the control unit 72 to set the driving force distribution ratio to "first drive wheel 12:second drive wheel 14=100:0". In the case that the driving force distribution ratio is "first drive wheel 12:second drive wheel 14=100:0", only the first drive wheel 12, out of the first drive wheel 12 and the second drive wheel 14, bears the entire required driving force. In this case, the second drive wheel 14 substantially functions as a driven wheel that is driven by the first drive wheel 12.

Figure 4:
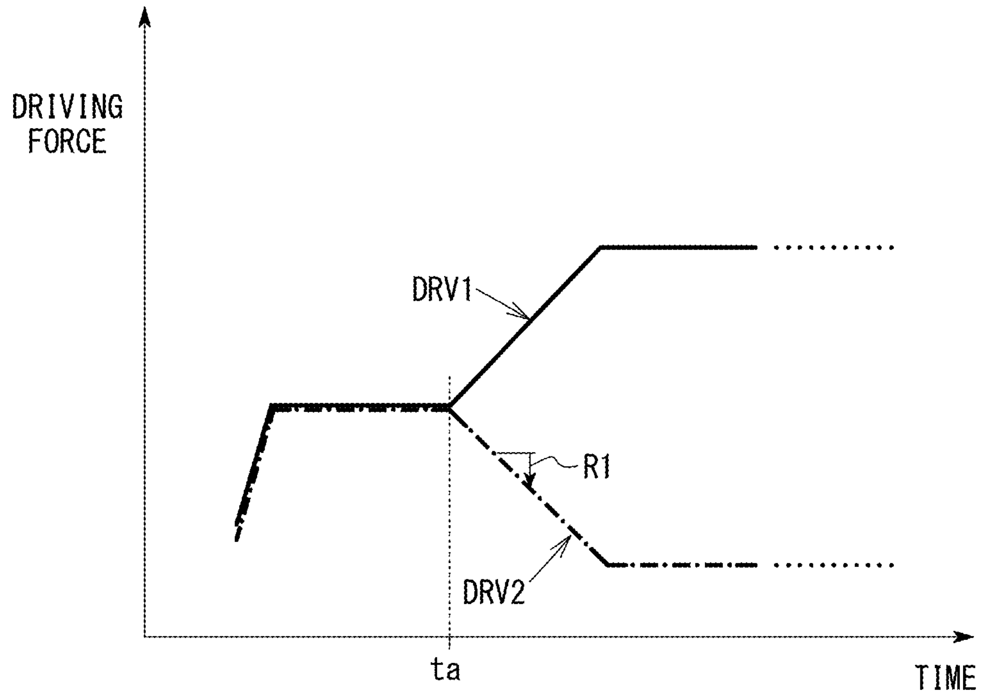
FIG. 4 is a graph illustrating changes over time in the first driving force and the second driving force in a case that a driving force distribution ratio is changed.

FIG. 4 is a graph illustrating changes over time in the first driving force DRV1 and the second driving force DRV2 in the case that the driving force distribution ratio is changed. The vertical axis of FIG. 4 represents the driving force (the first driving force DRV1 and the second driving force DRV2). The horizontal axis of FIG. 4 represents time.

Time ta is shown in FIG. 4. At time ta, the driving force distribution ratio between the first drive wheel 12 and the second drive wheel 14 is changed to "first drive wheel 12: second drive wheel 14=90:10". When the driving force distribution ratio of the second drive wheel 14 decreases in a state where the required driving force is maintained constant, the second driving force DRV2 output based on the driving force distribution ratio also decreases. That is, as shown in FIG. 4, the second driving force DRV2 decreases after time ta. In addition, the first driving force DRV1 increases in response to the decrease in the second driving force DRV2.

In the following description, for the sake of illustration, a case where the driving force distribution ratio is determined to be "first drive wheel 12:second drive wheel 14=50:50" by the process for determining the driving force distribution ratio will be described as an example.

The process for travel control is a process for controlling the first drive device 16 and the second drive device 18 to cause the vehicle 10 to travel. The control unit 72 controls the first drive device 16 and the second drive device 18 based on the required driving force calculated by the required driving force calculation unit 70 and the driving force distribution ratio determined by the process for determining the driving force distribution ratio.

The processes that can be executed by the control unit 72 are not limited to the process for determining the driving force distribution ratio and the process for travel control. Other processes that can be executed by the control unit 72 will be described later as appropriate.

The first determination unit 74 determines whether or not a predetermined first condition has been satisfied. The first condition includes continuation of a period in which the required driving force exceeds the driving force threshold for a predetermined time or more. Each of the driving force threshold and the predetermined time is determined based on, for example, experiments. The driving force threshold can be determined, for example, by assuming a required driving force in a case where the vehicle 10 is made to ascend a slope having a certain degree of inclination at a certain degree of vehicle speed (acceleration). The information indicating the driving force threshold and the information indicating the predetermined time are stored in advance in the storage unit 66. The length of the period (time) can be measured using, for example, a timer. The timer is realized, for example, by a processing circuitry included in the computation unit 64, however, the present invention is not limited to this feature.

When the first determination unit 74 determines that the first condition is fulfilled, the control unit 72 described above executes the second driving force limiting process. By the second driving force limiting process, the second driving force DRV2 is limited. Owing to the fact that the second driving force DRV2 is limited, the temperature rise of the second driving source 42 is suppressed.

The control unit 72 limits the second driving force DRV2 by, for example, reducing the driving force distribution ratio to the second drive wheel 14. For example, the driving force distribution ratio of "first drive wheel 12:second drive wheel 14=50:50" can be changed to "first drive wheel 12:second drive wheel 14=70:30" by the second driving force limiting process being executed. As described above, as the driving force distribution ratio to the second drive wheel 14 decreases in a state where the required driving force is maintained constant, the second driving force DRV2 output based on the driving force distribution ratio also decreases.

The amount of decrease (the rate of decrease) in the second driving force DRV2 in the case where the second driving force limiting process is executed may be constant or may vary in accordance with the required driving force. The control unit 72 may limit the second driving force DRV2 by decreasing the upper limit value of the second driving force DRV2 instead of decreasing the driving force distribution ratio to the second drive wheel 14.

The lower limit value of the driving force distribution ratio to the second drive wheel 14 in the case where the driving force distribution ratio is reduced by the second driving force limiting process is greater than zero. That is, in the second driving force limiting process, the driving force distribution ratio to the second drive wheel 14 is not set to zero. Therefore, as long as the required driving force is larger than zero, the second drive wheel 14 is continuously driven by the second drive device 18 even when the second driving force limiting process is executed.

The second determination unit 76 determines whether or not a second condition different from the first condition is fulfilled. The second determination unit 76 can determine whether or not the second condition is fulfilled in the case that the second driving force limiting process is executed. The second condition includes a condition that the second driving source temperature exceeds a temperature threshold. As described above, the second driving source temperature is the temperature of the second driving source 42. The information indicating the second driving source temperature is acquired by the information acquisition unit 68. The temperature threshold is determined, for example, based on experiments. In this case, the temperature threshold is determined in consideration of the overheat suppression process and the second rate of decrease R2, which will be described later, so as to prevent the second driving source 42 from overheating. The information indicating the temperature threshold is stored in advance in the storage unit 66.

In the case where the second determination unit 76 determines that the second condition is met in a state where the second driving force limiting process is being executed, the control unit 72 executes the overheat suppression process. The overheat suppression process is a process for further limiting the second driving force DRV2 limited by the second driving force limitation process described above. The second driving force DRV2 is limited by the overheat suppression process to such an extent that it is expected that the second driving source 42 can be sufficiently prevented from overheating. The second driving force DRV2 may be reduced to zero by the overheat suppression process. The overheating of the second driving source 42 is suppressed by the execution of the overheat suppression process.

When the overheat suppression process is executed, the control unit 72 reduces the second driving force DRV2 at a second rate of decrease R2 that is lower than the first rate of decrease R1.

The first rate of decrease R1 is an amount of decrease in the second driving force DRV2 per unit time in a case where the second driving force DRV2 is limited in a state where the second driving force limiting process is not executed. More specifically, the first rate of decrease R1 is an amount of decrease in the second driving force DRV2 per unit time in a case where the second driving force DRV2 is limited in a situation that the second condition is not satisfied. Therefore, for example, in the case where the second driving force DRV2 (the driving force distribution ratio to the second drive wheel 14) is reduced in response to the operation instruction by the driver in a situation that the second condition is not satisfied, the control unit 72 reduces the second driving force DRV2 based on the first rate of decrease R1 (see also FIG. 4).

As described above, the second rate of decrease R2 is smaller than the first rate of decrease R1. Therefore, the speed of decrease in the second driving force DRV2 in the case where the overheat suppression process is executed is lower than the speed of decrease in the second driving force DRV2 in the case where the second driving force DRV2 is decreased based on the first rate of decrease R1.

The second rate of decrease R2 is adjusted (determined) by the rate of decrease adjustment unit 78. The rate of decrease adjustment unit 78 adjusts the second rate of decrease R2 based on information indicating the required driving force and a predetermined setting map. The predetermined setting map is a map in which a correspondence relationship between the required driving force and the second rate of decrease R2 is defined. The predetermined setting map may be determined based on experiments. The predetermined setting map is stored in advance in the storage unit 66.

Figure 5:
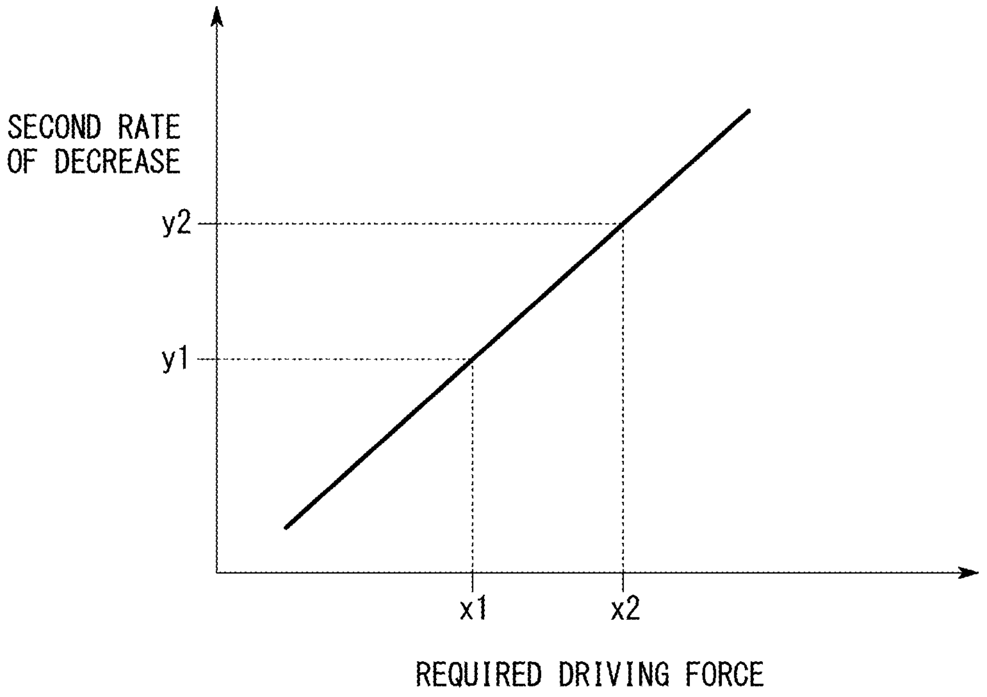
FIG. 5 is a graph illustrating a correlation between a required driving force and a second rate of decrease defined in a predetermined setting map.

FIG. 5 is a graph illustrating a relationship between the required driving force and the second rate of decrease R2, which is defined in a predetermined setting map. The vertical axis of FIG. 5 represents the second rate of decrease R2. The horizontal axis of FIG. 5 represents the required driving force.

The predetermined setting map is created such that the second rate of decrease R2 increases as the required driving force increases. For example, the predetermined setting map may be created such that the second rate of decrease R2 is proportional to the required driving force. FIG. 5 shows y1 which is the second rate of decrease R2 in the case where the required driving force is x1, and y2 which is the second rate of decrease R2 in the case where the required driving force is x2. x2 is larger than x1 and y2 is larger than y1 (x2>x1; y2>y1). By using such a predetermined setting map, the rate of decrease adjustment unit 78 can increase the second rate of decrease R2 as the required driving force increases. However, the maximum value of the second rate of decrease R2 in the predetermined setting map is smaller than the first rate of decrease R1.

Figure 6:
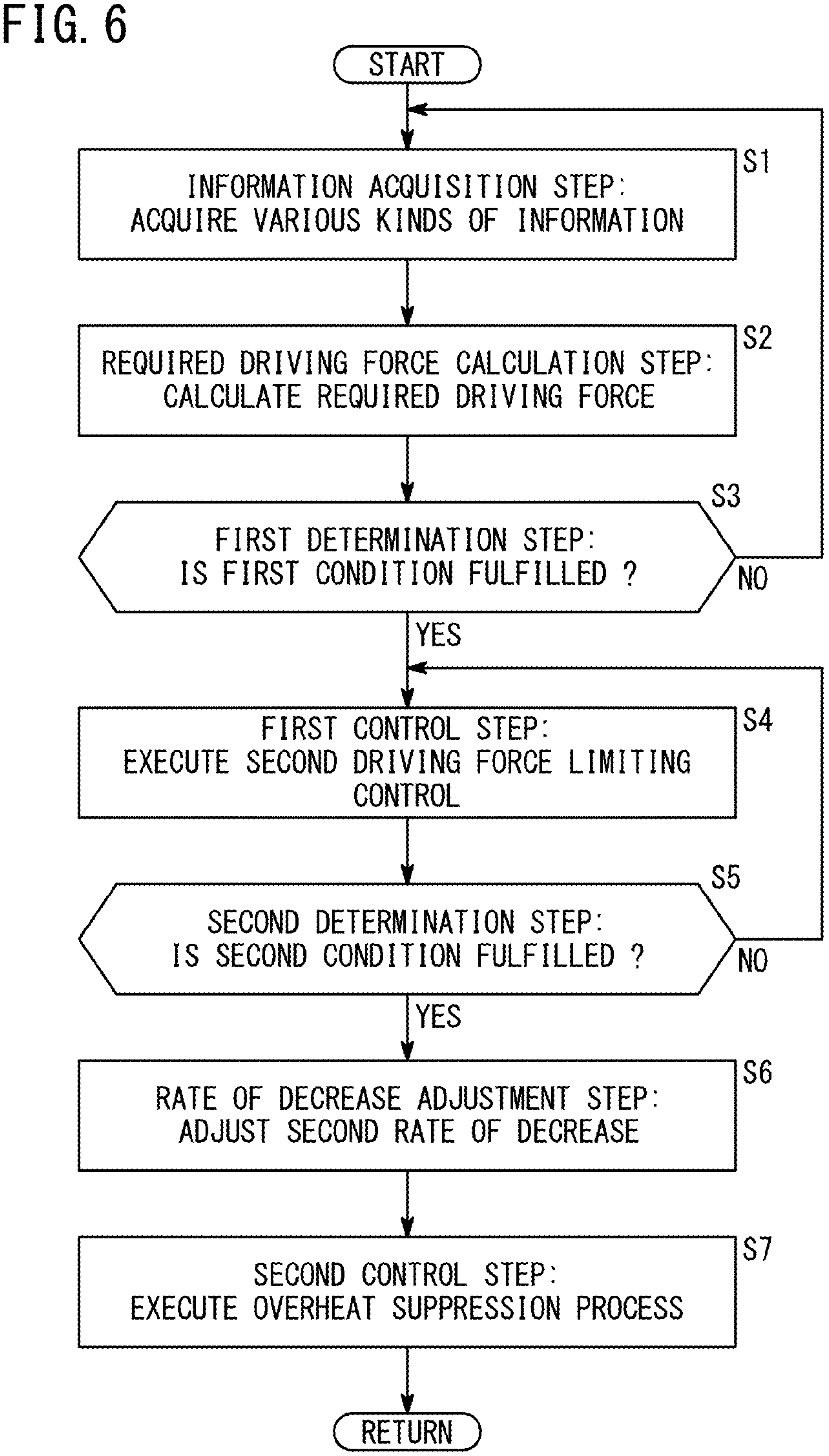
FIG. 6 is a flowchart of a vehicle control method according to the embodiment.
Figure 7:
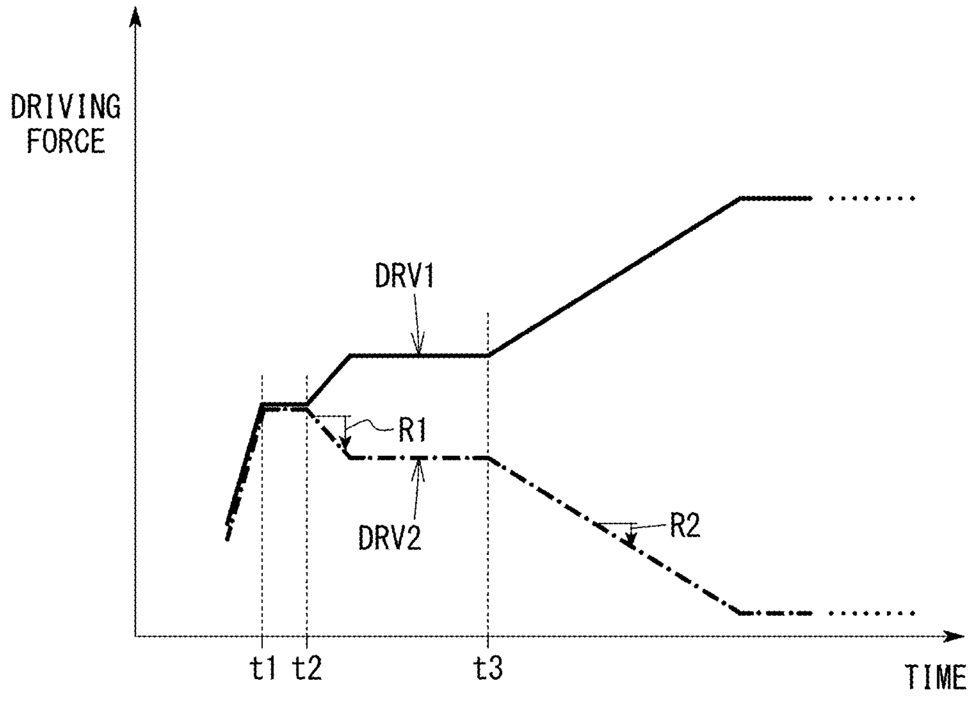
FIG. 7 is a graph illustrating changes over time in the first driving force and the second driving force.

FIG. 6 is a flowchart of a vehicle control method according to the embodiment. FIG. 7 is a graph illustrating changes over time in the first driving force DRV1 and the second driving force DRV2. The graph format of FIG. 7 is similar to that of FIG. 4.

A vehicle control method that can be executed by the vehicle control device 30 (computer) described above and the operation of the vehicle 10 during the execution of the vehicle control method will be described below. The vehicle control method shown in FIG. 6 is executed, for example, by the computation unit 64 (processor) executing programs which are stored in the storage unit 66 (memory). The vehicle control method includes an information acquisition step S1, a required driving force calculation step S2, a first determination step S3, a first control step S4, a second determination step S5, a rate of decrease adjustment step S6, and a second control step S7. In the following description, the vehicle 10 is traveling all through the execution of the vehicle control method.

In the information acquisition step S1, the information acquisition unit 68 acquires various kinds of information from the sensor group 28. The various kinds of information include, for example, information indicating the vehicle speed, information indicating the AP opening degree, and information indicating the second driving source temperature.

In the required driving force calculation step S2, the required driving force calculation unit 70 calculates the required driving force. The required driving force calculation unit 70 calculates the required driving force based on, for example, the information indicating the vehicle speed and the information indicating the AP opening degree.

In the first determination step S3, the first determination unit 74 determines whether or not the first condition is fulfilled. The first condition includes a situation where a period in which the required driving force keeps exceeding the driving force threshold continues for a predetermined time or longer. Therefore, in the first determination step S3, the first determination unit 74 determines whether or not the period in which the required driving force keeps exceeding the driving force threshold has continued for a predetermined time or longer.

FIG. 7 shows time t1 and time t2. At time t1, the required driving force starts exceeding the driving force threshold. By time t2, the required driving force has kept exceeding the driving force threshold for a predetermined time.

In the case where the first determination unit 74 determines that the first condition is not satisfied (S3: NO), the information acquisition step S1 is executed again. In the case where the first determination unit 74 determines that the first condition is satisfied (S3: YES), a first control step S4 is executed.

In the first control step S4, the control unit 72 executes the second driving force limiting process. As a result, the second driving force DRV2 decreases after time t2 in FIG. 7. The first driving force DRV1 increases after time t2. The second driving force limiting process is executed, and thus, the temperature rise of the second driving source 42 is suppressed.

The first control step S4 may be executed in a situation where the first condition is not fulfilled. Therefore, in the first control step S4, the control unit 72 can decrease the second driving force DRV2 based on the first rate of decrease R1 described above.

In the second determination step S5, the second determination unit 76 determines whether or not the second condition is satisfied. The second condition includes a situation where the second driving source temperature exceeds a temperature threshold. Therefore, in the second determination step S5, the second determination unit 76 determines whether the second driving source temperature exceeds the temperature threshold. The information indicating the second driving source temperature can be acquired in the information acquisition step S1 described above.

When the second determination unit 76 determines that the second condition is not satisfied (S5: NO), the first control step S4 is continued. When the second determination unit 76 determines that the second condition is satisfied (S5: YES), the rate of decrease adjustment step S6 and the second control step S7 are executed.

In the rate of decrease adjustment step S6, the rate of decrease adjustment unit 78 adjusts the second rate of decrease R2 described above. In the second control step S7, the control unit 72 executes the overheat suppression process based on the second rate of decrease R2 adjusted in the rate of decrease adjustment step S6. This suppresses overheating of the second driving source 42. The traveling of the hybrid vehicle 10 can be continued in a state where the second control step S7 is executed.

FIG. 7 shows time t3. At time t3, the overheat suppression process is started. After time t3, the second driving force DRV2 gradually decreases based on the second rate of decrease R2. The first driving force DRV1 gradually increases in response to the decrease in the second driving force DRV2. Upon doing so, the vehicle control method shown in FIG. 7 is brought to an end. The vehicle 10 can continue to travel in a state where the overheat suppression process is being executed.

The vehicle control device 30 (vehicle control method) and the vehicle 10 including the vehicle control device 30 described above can achieve, for example, the following operational effects.

The vehicle control device 30 includes a control unit 72. The control unit 72 executes the second driving force limiting process and the overheat suppression process. This suppresses the temperature rise (overheating) of the second driving source 42.

The traveling stability of the hybrid vehicle 10 changes in accordance with the change in the difference between the first driving force DRV1 and the second driving force DRV2. In this regard, according to the present embodiment, the control unit 72 reduces the second driving force DRV2 in a stepwise manner in response to the plurality of conditions (the first condition and the second condition) being satisfied. This suppresses a rapid increase in the difference between the first driving force DRV1 and the second driving force DRV2. As a result, the traveling stability of the vehicle 10 is suppressed from being rapidly changed.

The second condition includes a situation where the second driving source temperature exceeds a temperature threshold. In the case where the second condition is fulfilled, the vehicle control device 30 decreases the second driving force DRV2 based on a second rate of decrease R2 that is smaller than the first rate of decrease R1. Thus, the second driving force DRV2 gradually decreases over a relatively long period of time. In other words, even when the difference between the first driving force DRV1 and the second driving force DRV2 is increased, the difference increases at a relatively slow speed. As a result, overheating of the second driving source 42 and a rapid change in the traveling stability of the vehicle 10 are both suppressed.

As described above, the control unit 72 can suppress an increase in the temperature of the second driving source 42 by executing the second driving force limiting process. That is, the control unit 72 can hinder the second condition from being satisfied, by executing the second driving force limiting process. Thus, the difference between the first driving force DRV1 and the second driving force DRV2 is prevented from being increased by the overheat suppression process. As a result, the change in the traveling stability of the vehicle 10 is further suppressed.

In the first control step S4 described above, the control unit 72 can execute the second driving force limiting process by reducing the driving force distribution ratio to the second drive wheel 14 by a predetermined rate. Thus, for example, even when the required driving force changes in a state where the second driving force limiting process is executed, the control unit 72 can adjust the second driving force DRV2 in a flexible manner based on the driving force distribution ratio.

In the first control step S4 described above, the control unit 72 can execute the second driving force limiting process by lowering the upper limit value of the second driving force DRV2. The upper limit value does not change in accordance with a change in the required driving force. The upper limit value of the second driving force DRV2 is determined regardless of the change in the required driving force, and thus the management of the second driving source temperature is facilitated. In this case, the control unit 72 can adjust the driving force distribution ratio to the first drive wheel 12 and the driving force distribution ratio to the second drive wheel 14 in a flexible manner based on the required driving force and the second driving force DRV2 (the upper limit value described above).

The larger the required driving force is, the more easily the temperature of the second driving source 42 rises. In this regard, according to the present embodiment, the rate of decrease adjustment unit 78 increases the second rate of decrease R2 within a range less than the first rate of decrease R1 as the required driving force increases. Thus, the control unit 72 can relatively quickly reduce the second driving force DRV2 in the overheat suppression process while maintaining the traveling stability of the vehicle 10 for a relatively long period of time. As a result, overheating of the second driving source 42 is suppressed.

The vehicle control device 30 suppresses overheating of the second driving source 42, thereby improving the degree of freedom in designing the vehicle 10 with respect to the cooling mechanism of the second driving source 42. That is, according to the present embodiment, the cooling efficiency of the second driving source 42 can be made lower than the cooling efficiency of the first driving source 34. For example, as described above, the refrigerant RF3 can be done with air-cooling, as opposed to a refrigerant RF2 that is liquid-cooled. In this case, the air-cooling device 26 can be configured to be relatively simple as compared with the cooling device 24. By using the simple air-cooling device 26 as the cooling device for the refrigerant RF3, an increase in the manufacturing cost of the vehicle 10 can be suppressed.

The above-described embodiment may be modified in the manner described below. Moreover, it should be noted that in the present exemplary modification, explanations that overlap or are redundant with those of the embodiment will be omitted as necessary. In the drawings used for explanation of the present exemplary modification, the same reference numerals are assigned to the same constituent elements as those described in the embodiment.

Modified Embodiment 1

The vehicle 10 is not limited to a hybrid AWD vehicle. For example, the vehicle 10 may be an electric vehicle.

Modified Embodiment 2

The overheat suppression process, which is a process of reducing the second driving force DRV2 at the second rate of decrease R2, may include an interpretation of reducing the driving force distribution ratio to the second drive wheel 14 based on the second rate of decrease R2. That is, the second rate of decrease R2 may be an amount of decrease per unit time of the driving force distribution ratio to the second drive wheel 14 in the case where the second driving force DRV2 is limited. The control unit 72 can limit the second driving force DRV2 by reducing the driving force distribution ratio to the second drive wheel 14 based on the second rate of decrease R2.

Modified Embodiment 3

The first condition may include a situation where there is snow (snow accumulation, snowfall) around the vehicle 10. The first determination unit 74 can determine whether or not there is snow around the vehicle 10 based on, for example, captured image information acquired by an image capturing device that captures an image of the surroundings of the vehicle 10. The image capturing device may be provided in the vehicle 10 as appropriate.

In a cold environment where snow is accumulated or falling, the temperature of the first driving source 34 is relatively unlikely to rise. That is, in such a cold environment where snow is accumulated or falling, it is expected that overheating of the first driving source 34 is suppressed.

According to the present modification, only when the environment around the vehicle 10 is relatively cold, the control unit 72 can increase the driving force distribution ratio to the first drive wheel 12 by the second driving force limiting process. In this manner, overheating of the first driving source 34 is suppressed.

Modified Embodiment 4

The first condition may include a situation where the outside air temperature is equal to or higher than an outside air temperature threshold. The outside air temperature threshold is determined in advance, for example, based on experiments. Information indicating the outside air temperature threshold is stored in advance in the storage unit 66.

The temperature rise of the second driving source 42 is also suppressed by the cold outside air. Therefore, even when the period in which the required driving force exceeds the driving force threshold continues for a predetermined time or longer, overheating of the second driving source 42 can be suppressed without the second driving force limiting process if the outside air temperature is low to some extent.

According to the present modification, the vehicle 10 can be caused to travel based on the driving force distribution ratio determined by the process for determining the driving force distribution ratio over as long a period as possible while suppressing overheating of the second driving source 42.

Combination of Modifications

The modifications described above may be appropriately combined within a range not contradicting each other.

According to the above-described embodiment and modifications, the vehicle 10 can exhibit stable traveling performance for a longer time by the vehicle control device 30 (vehicle control method).

The following supplementary notes are further disclosed in relation to the above embodiment.

Supplementary Note 1

The vehicle control device (30) according to the present disclosure for controlling the vehicle (10) including the first drive device (16) for driving the first drive wheel (12) and the second driving source (42) for driving the second drive wheel (14), the vehicle control device comprising: the first determination unit (74) configured to determine whether a predetermined first condition is fulfilled; the second determination unit (76) configured to determine whether a second condition different from the first condition is fulfilled; and the control unit (72) configured to execute a second driving force limiting process for limiting a second driving force (DRV2) output from the second driving source in a case that the first determination unit determines that the first condition is fulfilled, and further limit the second driving force in a case that the second determination unit determines that the second condition is fulfilled while the second driving force limiting process is being executed, wherein the control unit is configured to decrease the second driving force at the first rate of decrease (R1) in a case that the second driving force is limited while the second driving force limiting process is not being executed, and decrease the second driving force at the second rate of decrease (R2) smaller than the first rate of decrease (R1) in a case that the second determination unit determines that the second condition is satisfied while the second driving force limiting process is being executed. Thus, the vehicle can exhibit stable traveling performance for a longer time.

Supplementary Note 2

In the vehicle control device according to the Supplementary Note 1, the first condition may include a situation where a required driving force required for the vehicle continues to exceed a predetermined driving force threshold for a predetermined period of time or longer. Thus, the vehicle control device can suppress overheating of the second driving source in a situation where the temperature of the second driving source is likely to rise.

Supplementary Note 3

In the vehicle control device according to Supplementary Note 2, the first condition may further include a situation where an outside air temperature is equal to or higher than a predetermined outside air temperature threshold. Thus, the vehicle control device can suppress overheating of the second driving source in a situation where the temperature of the second driving source is likely to rise.

Supplementary Note 4

In the vehicle control device according to any one of Supplementary Notes 1 to 3, the second condition may include a situation where the second driving source temperature, which is a temperature of the second driving source, exceeds the predetermined temperature threshold. Thus, the vehicle control device can more reliably suppress overheating of the second driving source.

Supplementary Note 5

The vehicle control device according to any one of Supplementary Notes 1 to 4 may further include the rate of decrease adjustment unit (78) configured to adjust the second rate of decrease based on a required driving force required for the vehicle, wherein the rate of decrease adjustment unit makes the second rate of decrease greater as the required driving force required for the vehicle is greater. Thus, the vehicle control device can quickly suppress overheating of the second driving source while suppressing a rapid change in the traveling stability of the vehicle.

Supplementary Note 6

In the vehicle control device according to any one of Supplementary Notes 1 to 5, the control unit may be configured to execute the second driving force limiting process by lowering the driving force distribution ratio to the second drive wheel. Thus, the vehicle control device can suppress a rapid change in the traveling stability of the vehicle in response to a change in the required driving force.

Supplementary Note 7

In the vehicle control device according to any one of Supplementary Notes 1 to 5, the control unit may be configured to execute the second driving force limiting process by lowering an upper limit value of the second driving force. In this way, the vehicle control device can easily manage the second driving source temperature.

Supplementary Note 8

In the vehicle control device according to any one of Supplementary Notes 1 to 7, a cooling efficiency of the second driving source may be lower than a cooling efficiency of the first drive device.

Supplementary Note 9

The vehicle control device according to any one of Supplementary Notes 1 to 8 may be configured such that the vehicle is provided with an air-cooling device (26) configured to air-cool a refrigerant for cooling the second driving source.

Supplementary Note 10

A vehicle (10) according to the present disclosure includes the vehicle control device according to any one of Supplementary Notes 1 to 9. Thus, the vehicle can exhibit stable traveling performance for a longer time.

Supplementary Note 11

A vehicle control method executed by a computer for controlling a vehicle (10) including a first drive device (16) for driving a first drive wheel (12) and a second driving source (42) for driving a second drive wheel (14), the vehicle control method comprising: a first determination step (S3) of determining whether a predetermined first condition is fulfilled; a first control step (S4) of executing a second driving force limiting process for limiting a second driving force (DRV2) output from the second driving source in a case that fulfillment of the first condition is determined in the first determination step; a second determination step (S5) of determining whether a second condition different from the first condition is fulfilled; and a second control step (S7) of further limiting the second driving force in a case that fulfillment of the second condition is determined in the second determination step while the second driving force limiting process is being executed, wherein in the second control step, the second driving force is decreased at a second rate of decrease (R2) smaller than a first rate of decrease (R1) at which the second driving force is decreased to be limited while the second driving force limiting process is not being executed. Thus, the vehicle can exhibit stable traveling performance for a longer time.

Supplementary Note 12

A program according to the present disclosure is configured to cause the computer to execute the vehicle control method according to Supplementary Note 11. Thus, the vehicle can exhibit stable traveling performance for a longer time.

It should be noted that the present invention is not limited to the disclosure described above, and various additional or alternative configurations could be adopted therein without departing from the essence and gist of the present disclosure.

The invention claimed is:

1. A vehicle control device for controlling a vehicle including a first driving source for driving a first drive wheel and a second driving source for driving a second drive wheel, the vehicle control device comprising one or more processors that execute computer-executable instructions stored in a memory, wherein the one or more processors execute the computer-executable instructions to cause the vehicle control device to:

determine whether a predetermined first condition is fulfilled;

determine whether a second condition different from the first condition is fulfilled;

execute a second driving force limiting process for limiting a second driving force output from the second driving source in a case that fulfillment of the first condition is determined, and further limit the second driving force in a case that fulfillment of the second condition is determined while the second driving force limiting process is being executed;

decrease the second driving force at a first rate of decrease in a case that the second driving force is limited while the second driving force limiting process is not being executed; and decrease the second driving force at a second rate of decrease smaller than the first rate of decrease in a case that fulfillment of the second condition is determined while the second driving force limiting process is being executed.

2. The vehicle control device according to claim 1, wherein:

the first condition includes a situation where a required driving force required for the vehicle continues to exceed a predetermined driving force threshold for a predetermined period of time or longer.

3. The vehicle control device according to claim 2, wherein:

the first condition further includes a situation where an outside air temperature is equal to or higher than a predetermined outside air temperature threshold.

4. The vehicle control device according to claim 1, wherein:

the second condition includes a situation where a second driving source temperature, which is a temperature of the second driving source, exceeds a predetermined temperature threshold.

5. The vehicle control device according to claim 1, wherein the one or more processors cause the vehicle control device to:

adjust the second rate of decrease based on a required driving force required for the vehicle; and make the second rate of decrease greater as the required driving force required for the vehicle is greater.

6. The vehicle control device according to claim 1, wherein the one or more processors cause the vehicle control device to:

execute the second driving force limiting process by lowering a driving force distribution ratio to the second drive wheel.

7. The vehicle control device according to claim 1, wherein the one or more processors cause the vehicle control device to:

execute the second driving force limiting process by lowering an upper limit value of the second driving force.

8. The vehicle control device according to claim 1, wherein a cooling efficiency of the second driving source is lower than a cooling efficiency of the first drive device.

9. The vehicle control device according to claim 1, wherein the vehicle is provided with an air-cooling device configured to air-cool a refrigerant for cooling the second driving source.

10. A vehicle comprising the vehicle control device according to claim 1.

11. A vehicle control method executed by a computer for controlling a vehicle including a first driving source for driving a first drive wheel and a second driving source for driving a second drive wheel, the vehicle control method comprising:

a first determination step of determining whether a predetermined first condition is fulfilled;

a first control step of executing a second driving force limiting process for limiting a second driving force output from the second driving source in a case that fulfillment of the first condition is determined in the first determination step;

a second determination step of determining whether a second condition different from the first condition is fulfilled; and a second control step of further limiting the second driving force in a case that fulfillment of the second condition is determined in the second determination step while the second driving force limiting process is being executed, wherein in the second control step, the second driving force is decreased at a second rate of decrease smaller than a first rate of decrease at which the second driving force is decreased to be limited while the second driving force limiting process is not being executed.

12. A non-transitory tangible computer-readable storage medium storing a program configured to cause a computer to execute the vehicle control method according to claim 11.

* * * * *